United States Patent [19]

Shimizu et al.

[11] Patent Number: 5,612,877
[45] Date of Patent: Mar. 18, 1997

[54] ELECTRIC POWER STEERING APPARATUS

[75] Inventors: Yasuo Shimizu; Shigeru Yamawaki; Shinzi Hironaka; Yoshinobu Mukai, all of Wako, Japan

[73] Assignee: Honda Giken Kogyo Kabushiki Kaisha, Tokyo, Japan

[21] Appl. No.: 462,593

[22] Filed: Jun. 5, 1995

[30] Foreign Application Priority Data

Jun. 27, 1994 [JP] Japan .................................. 6-145043

[51] Int. Cl.$^6$ .................................................. B62D 5/04
[52] U.S. Cl. ................................ 364/424.051; 180/446
[58] Field of Search ..................... 364/424.05; 180/443, 180/446; 318/434

[56] References Cited

U.S. PATENT DOCUMENTS

| | | | |
|---|---|---|---|
| 4,688,655 | 8/1987 | Shimizu | 180/446 |
| 4,715,461 | 12/1987 | Shimizu | 180/446 |
| 4,754,829 | 7/1988 | Shimizu | 180/446 |
| 4,819,170 | 4/1989 | Shimizu | 364/424.05 |
| 5,253,725 | 10/1993 | Nishimoto | 180/446 |
| 5,460,235 | 10/1995 | Shmizu | 180/446 |
| 5,469,357 | 11/1995 | Nishimoto | 364/424.05 |
| 5,507,359 | 4/1996 | Wada | 180/446 |

FOREIGN PATENT DOCUMENTS 63-19386   1/1988   Japan .

*Primary Examiner*—Michael Zanelli
*Attorney, Agent, or Firm*—Armstrong, Westerman, Hattori, McLeland & Naughton

[57] ABSTRACT

This invention is an electric power steering apparatus for applying the power of an electric motor to a steering system to reduce the steering torque, comprising a steering torque detection means, steering rotating speed detection means, a differential operation means, an electric motor control signal determination means, and an electric motor drive means. The apparatus detects the steering torque and steering rotating speed of the steering system to generate as an electric motor control signal a control quantity obtained by damping the value corresponding to the steering rotating speed from the value corresponding to the steering torque and then adding to the result a steering torque differential value in order to drive the electric motor based on this electric motor control signal, thereby enabling a steering assist torque corresponding to a change in the steering torque to be obtained even when a steering operation with a sudden increase in the steering torque is performed and thus enabling a responsive steering assist torque to be generated to improve the steering feeling.

6 Claims, 13 Drawing Sheets

ELECTRIC POWER STEERING APPARATUS

BACKGROUND OF THE INVENTION

1. Field of the Invention

The present invention relates to an electric power steering apparatus that directly applies the power of an electric motor to a steering system as a steering assist torque to reduce the steering torque required from the driver.

2. Description of the Related Art

An electric power steering apparatus has been proposed by the applicant in U.S. Ser No. 08/353300 filed on Dec. 6, 1994 wherein the steering system includes an electric motor and wherein a power supplied by the electric motor is controlled by a controller to generate a steering assist torque in order to reduce the steering torque required from the driver.

Conventional electric power steering apparatuses comprise a steering torque detection means for detecting the steering torque of a steering system and a steering rotating speed detection means for detecting the rotating speed of the steering system, and causes a controller to provide an electric motor control signal (for example, a target current value) based on the detected steering torque and rotating speed in order to drive the electric motor via an electric motor drive means, thereby providing a steering assist torque corresponding to the steering torque effected by the driver.

Furthermore, conventional power steering apparatuses generate an electric motor control signal suitable to the travel state of the vehicle based on a steering rotating speed signal from the steering rotating speed detection means and a car velocity signal from the car velocity detection means to, for example, apply a large amount of damping to the steering system in order to stabilize the behavior of the vehicle during fast travel, while reducing the amount of damping applied to the steering system during slow travel to improve the returning of the steering wheel, thereby enabling the generation of damping according to the velocity of the vehicle.

A known electric power steering apparatus that eliminates a sense of delayed wheel-turning due to a delay in the response from the steering system at the beginning of steering by controlling the assist torque based on the sum of a value proportional to a steering torque signal and a differential value of the same signal is also disclosed in Japanese Laid Open 63-19386.

Although conventional power steering apparatuses controls the damping characteristics of the steering system so that the amount of damping will be reduced during slow travel to increase the steering assist torque while the amount of damping will be increased during fast travel to reduce the steering assist torque, thereby varying the amount of damping according to the car velocity to improve the steering feeling of the vehicle, they have the following problems.

If, for example, a quick wheel operation is required during fast travel when the amount of damping is increasing and the driver attempts to perform a wheel operation with a high steering rotating speed, a large steering torque is required due to the small set value of the steering assist torque, preventing a desired steering operation.

In addition, since damping also occurs near the neutral position of the steering wheel, a large steering torque is required for a steering operation with a quickly varying steering speed, resulting in a degraded steering feeling.

SUMMARY OF THE INVENTION

This invention provides an electric power steering apparatus that directly applies the power of an electric motor to a steering system as a steering assist torque to reduce the steering torque required from the driver, comprising a steering torque detection means, steering rotating speed detection means, a differential operation means, an electric motor control signal determination means, and an electric motor drive means, wherein the apparatus, detects the steering torque and steering rotating speed of the steering system to generate as an electric motor control signal a control quantity obtained by damping the value corresponding to the steering rotating speed from the value corresponding to the steering torque and then adding to the result a steering torque differential value in order to drive the electric motor based on this electric motor control signal, thereby enabling a steering assist torque corresponding to a change in the steering torque to be obtained even when a steering operation with a sudden increase in the steering torque is performed and thus enabling a responsive steering assist torque to be generated to improve the steering feeling.

In addition, this invention comprises a steering torque detection means, steering rotating speed detection means, a differential operation means, an electric motor control signal determination means, and an electric motor drive means, and on detecting the turning state of the steering system, generates a control quantity obtained by correctively damping the value corresponding to the steering rotating speed from the value corresponding to the steering torque, while on detecting the returning state of the steering system, generating a control quantity obtained by correctively adding the value corresponding to the steering rotating speed to the value corresponding to the steering torque, and if the direction of the steering torque matches the direction of the steering torque difference, generates as an electric motor control signal a control quantity obtained by correctively adding a steering torque differential value to the control quantity obtained by corrective substraction or addition, while generating as an electric motor control signal a control quantity obtained by correctively damping a steering torque differential value from said control quantity if the direction of the steering torque fails to match the direction of the steering torque difference, in order to drive the electric motor based on these electric motor control signals, thereby providing a steering assist torque according to the combination of the turning or returning state of the steering system and the match or mismatch state of the steering torque direction and thus an optimum steering assist torque according to the vehicle travel state and the steering operation state.

The steering state detection means determines the turning state of the steering system when the direction of the steering torque matches the direction of the steering rotating speed, whereas it determines the returning state of the steering system when the direction of the steering torque fails to match the direction of the steering rotating speed.

The steering torque direction determination means determines a match when the direction of the steering torque matches the direction of a steering torque differential value, whereas it determines a mismatch when the direction of the steering torque fails to match the direction of the steering torque differential value.

Furthermore, this invention provides an electric power steering apparatus including an electric motor control signal determination means for correctively damping from the control quantity the value corresponding to a signal output from the differential operation means based on the value corresponding to a signal output from the steering torque detection means to correct the steering assist torque using the value corresponding to a signal output from the differential operation means and corresponding to the steering torque, thereby providing a steering assist torque according to the steering torque.

In addition, this invention provides an electric power steering apparatus including an electric motor control signal determination means for correctively damping from the control quantity the value corresponding to a signal output from the differential operation means based on the value corresponding to a signal output from the car velocity detection means to correct the steering assist torque using the value corresponding to a signal output from the differential operation means and corresponding to the car velocity, thereby providing a steering assist torque according to the car velocity.

Furthermore, this invention provides an electric power steering apparatus including an electric motor control signal determination means for correctively damping from the control quantity the value corresponding to a signal output from the differential operation means based on both the value corresponding to a signal output from the steering torque detection means and the value corresponding to a signal output from the car velocity detection means to correct the steering assist torque using the value corresponding to a signal output from the differential operation means and corresponding to both the steering torque and car velocity, thereby providing a steering assist torque according to both the steering torque and car velocity.

This invention can realize an electric power steering apparatus with a high steering performance which generates a steering assist torque that can fit the amount of damping for the steering system to the characteristics of the vehicle and smoothly increase the steering torque while preventing an unwanted increase in the steering torque due to a quick steering operation during fast travel by providing the steering system with a differential operation means, a steering state detection means, and a steering torque direction determination means, etc.

DETAILED DESCRIPTION

A preferred embodiment of this invention is described below with reference to the drawings.

Figure 1:
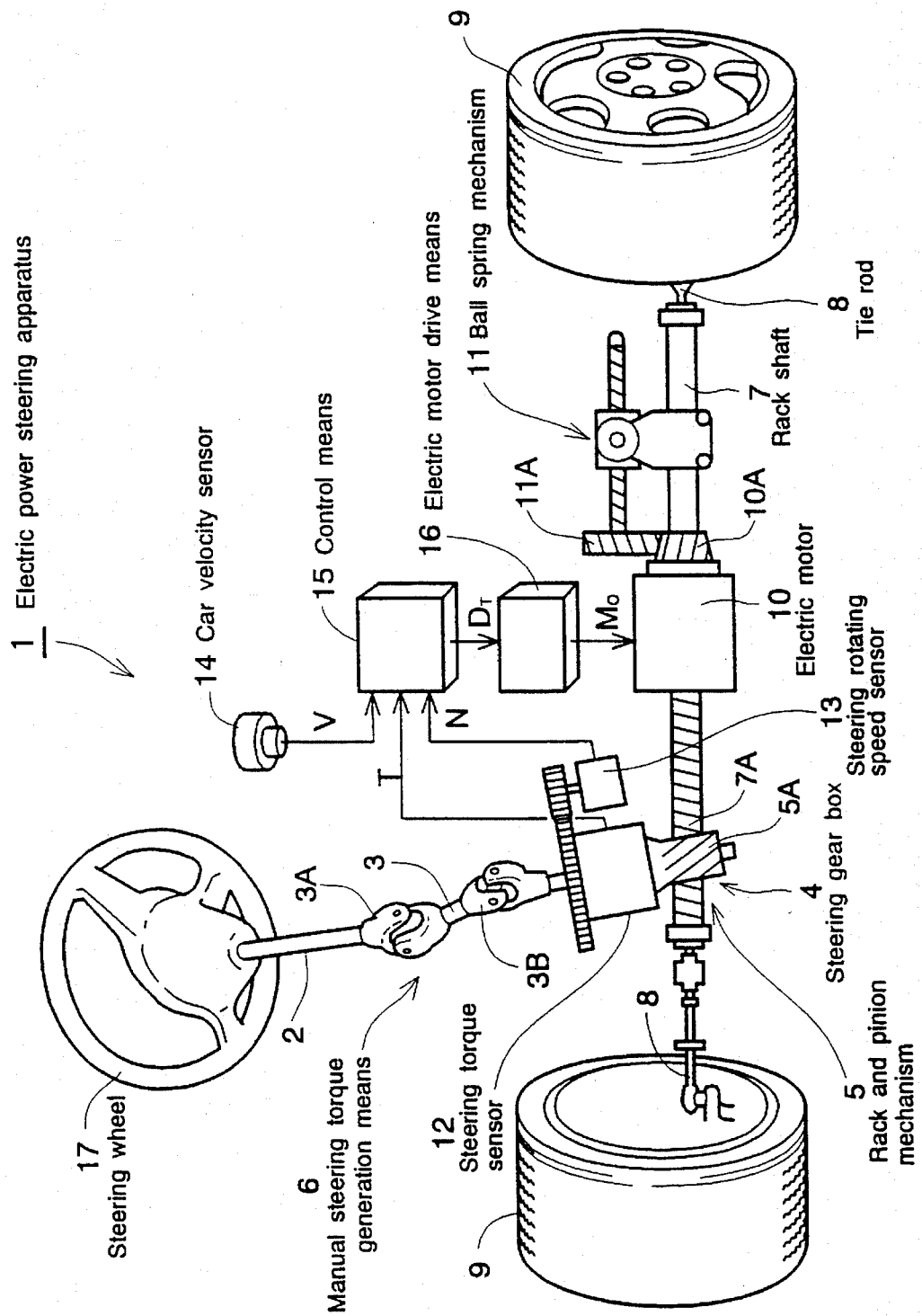
FIG. 1 is a general block diagram of a power steering apparatus according to this invention.

FIG. 1 is a general block diagram of an electric power steering apparatus according to this invention.

In this figure, an electric power steering apparatus 1 comprises a manual steering torque generation means 6 connected to a steering shaft 2 attached integrally to a steering wheel 17 and also connected to a rack and pinion mechanism 5 installed in a steering gear box 4 via a connecting shaft 3 having universal couplings 3A, 3B.

The rack and pinion mechanism 5 includes rack teeth 7A engaging a pinion 5A, and this engagement causes rotational movement to be converted into straight movement, which then causes a rack shaft 7 to move reciprocally, the rack shaft connected via tie rods 8 provided at both ends thereof to left and right front wheels 9 that work as steering control wheels.

Thus, the steering wheel 17 is manually operated to change the direction of the vehicle by oscillating the front wheels 9 via this normal rack and pinion steering system.

To reduce such a manual steering torque effected by the manual steering torque generation means 6, an electric motor 10 for generating a steering assist torque is located coaxially with the rack shaft 7 so as to convert the rotational force of the electric motor 10 into a thrust via a ball spring mechanism 11 provided in parallel with the rack shaft 7, the thrust thus applied to the rack shaft 7.

A driving helical gear 10A is installed integrally on the rotor of the electric motor 10, and engages a driven helical gear 11A installed integrally at the end of the spring shaft of the ball spring mechanism 11.

A steering torque sensor 12 for detecting a manual steering torque T applied to the pinion 5A is installed in the steering gear box 4 to provide steering torque signals T to a control means 15.

The control means 15 controls an electric motor drive signal $M_o$ that drives the electric motor 10 by supplying an electric motor control signal $D_T$ to an electric motor drive means 16 based on the steering torque signal T.

The control means 15 also includes an electric motor control signal determination means for providing a target electric motor control signal $D_T$ to the electric motor drive means 16 that drives the electric motor 10 by supplying an electric motor drive signal (for example, a target drive current) thereto, thereby driving and controlling the electric motor 10 using the electric motor drive signal $M_o$ (a target drive current) corresponding to the steering torque signal T. An assist torque generated by the electric motor 10 is then transmitted to the rack shaft 7 to assist the thrust of the rack shaft 7.

Furthermore, the control means 15 is structured to generate an electric motor control signal obtained by synthesizing the electric motor control signal $M_o$ corresponding to a value obtained by differentiating the steering torque T, the electric motor control signal corresponding to a steering rotating speed signal N detected by a steering rotating speed sensor 13, and the electric motor control signal corresponding to the steering torque signal T and to generate a car velocity coefficient $R_V$ based on a car velocity signal V detected by a car velocity sensor 14, in order to drive and control the electric motor 10 using a corrected electric motor drive signal.

The control means 15 is also structured to generate a torque coefficient $R_T$ based on the steering torque signal T and to obtain the electric motor control signal corresponding to a value obtained by differentiating the steering torque T using the torque coefficient $R_T$.

Figure 2:
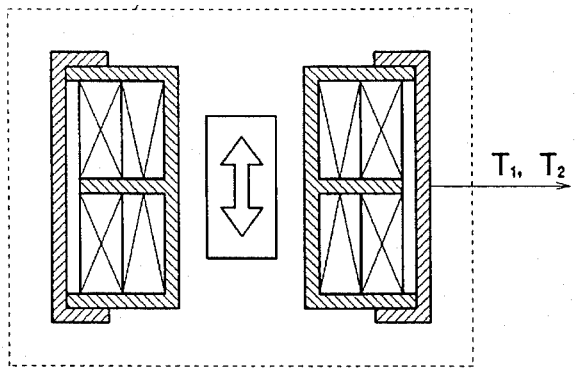
FIG. 2 is a block diagram of an embodiment of a steering torque sensor.
Figure 3:
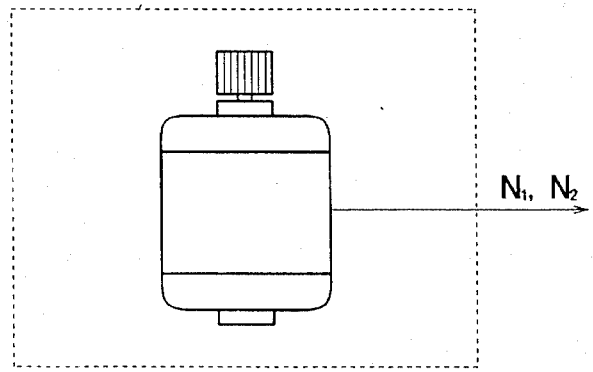
FIG. 3 is a block diagram of an embodiment of a steering rotating speed sensor.
Figure 4:
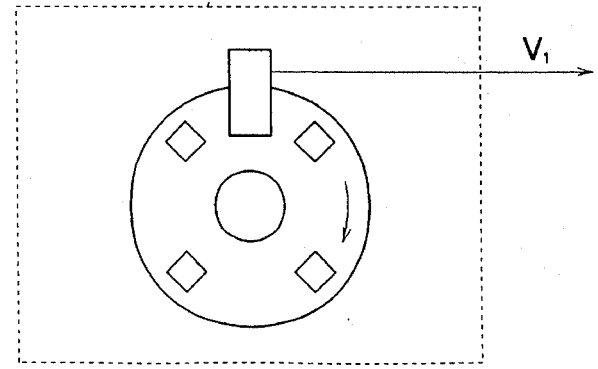
FIG. 4 is a block diagram of an embodiment of a car velocity sensor.

FIG. 2 is a block diagram of an embodiment of the steering torque sensor. FIG. 3 is a block diagram of an embodiment of the steering rotating speed sensor. FIG. 4 is a block diagram of an embodiment of the car velocity sensor.

FIGS. 2 to 4 show the steering torque sensor 12 comprising a differential transformer, the steering rotating speed sensor 13 comprising a DC generator such as a tachogenerator, and the car velocity sensor 14 that is a speed meter comprising a rotating disc with slits and a photocoupler, respectively.

The steering torque sensor 12 outputs as electric signals, torque signals according to the direction of steering rotation and the torque (for example, a left vector quantity $T_1$ and a right vector quantity $T_2$), the steering rotating speed sensor 13 outputs as electric signals, signals according to the direction of rotation and the rotating speed (for example, a left vector quantity $N_1$ and a right vector quantity $N_2$), and the car velocity sensor 14 outputs as electric signals, car velocity signals $V_1$ (scalar quantities) according to the car velocity.

Figure 5:
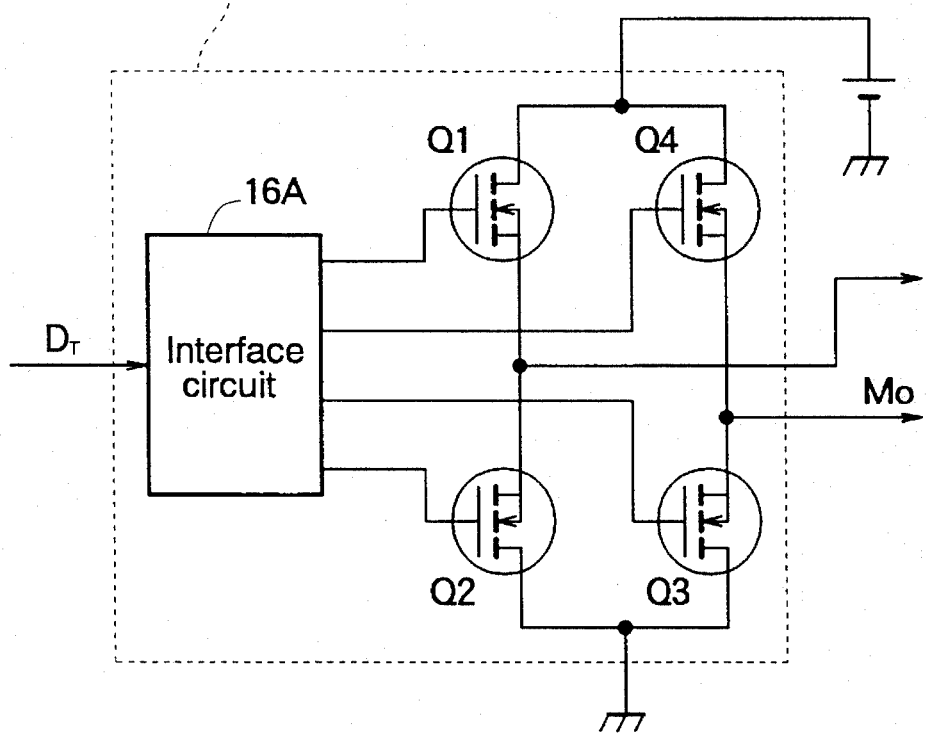
FIG. 5 is a block diagram of an embodiment of an electric motor drive means comprising an FET bridge.

FIG. 5 is a block diagram of an embodiment of the electric motor drive means comprising an FET bridge.

In this figure, the electric motor drive means 16 is a bridge circuit comprising an interface circuit 16A and four field effect transistors (FETs) Q1 to Q4 to output the electric motor drive signal $M_o$ that drives the electric motor 10 based on the electric motor control signal $D_T$.

The electric motor control signal $D_T$ input to the interface circuit 16A is formed of, for example, a direction signal that controls the rotational direction of the electric motor 10 and a pulse width modulation (PWM) signal that controls the drive quantity (the drive torque and the rotating speed) of the electric motor 10. If, for example, the electric motor is rotated rightward, the direction signal turns the FET Q1 on, and the duty factor of the PWM signal controls the gate of the FET Q3.

If the electric motor is rotated leftward, the direction signal turns the FET Q4 on, and the PWM signal controls the gate of the FET Q2.

Furthermore, the FETs Q1 and Q4 or Q2 and Q3 can be simultaneously turned on to short between the input terminals of the electric motor 10, thereby providing electromagnetic braking.

Figure 6:
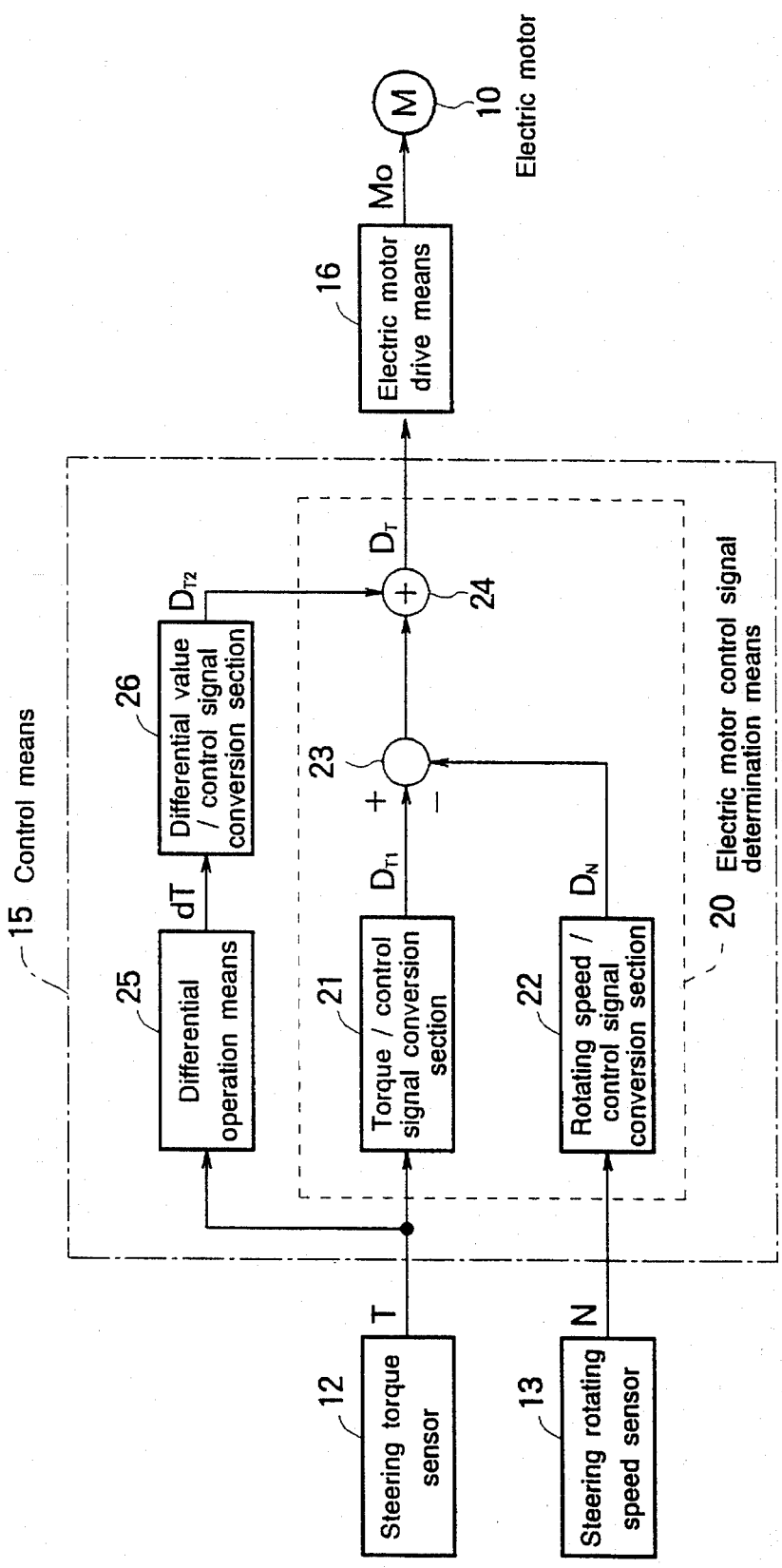
FIG. 6 is a functional block diagram of the integral part of a first embodiment of a control means in the electric power steering means according to this invention.

FIG. 6 is a functional block diagram of the integral part of a first embodiment of a control means in the electric power steering apparatus according to this invention.

In this figure, a control means 15 primarily comprises a microprocessor, and includes a differential operation means 25, a differential value/control signal conversion section 26, and an electric motor control signal determination section 20. The control means 15 generates an electric motor control signal $D_T$ based on the steering torque signal T detected by the steering torque sensor 12 and the steering rotating speed signal N detected by the steering rotating speed sensor 13, and supplies it to the electric motor drive means 16 to control and drive the electric motor 10.

The differential operation means 25 comprises a differential operation circuit or a software-based operation program. The differential operation means 25 differentiates the steering torque signal T from the steering torque sensor 12, and provides the torque differential value dT to the differential value/control signal conversion section 26.

Figure 13:
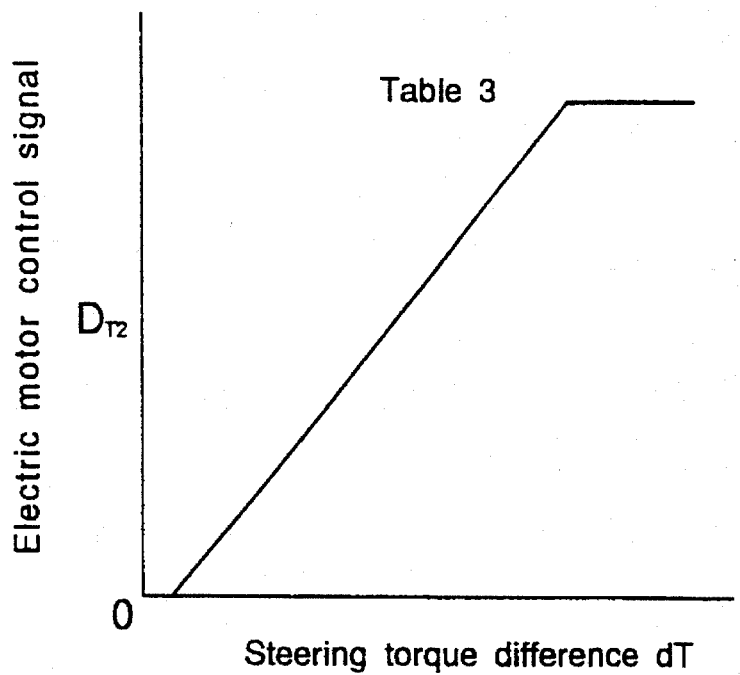
FIG. 13 is a characteristic chart showing the steering torque difference dT versus the electric motor control signal $D_{T2}$ (Table 3)

The differential value/control signal conversion section 26 comprises a memory such as a ROM, selects and outputs to the electric motor control signal determination means 20 the electric motor control signal $D_{T2}$ corresponding to the differential value dT supplied from the differential operation means 25 based on a table showing the correspondence of the differential value dT and the electric motor control signal $D_{T2}$ which have been set in advance based on experimental or designed values. The correspondence table for the steering torque difference dT (the differential value dT) and the electric motor control signal $D_{T2}$ should have a characteristic such that the electric motor control signal $D_{T2}$ remains 0 until the differential value dT reaches a specified value and then increase linearly and finally becomes saturated, as shown in FIG. 13 (Table 3).

As described above, since the control means 15 of the electric power steering apparatus 1 according to this invention includes the differential operation means 25 and the differential value/control signal conversion section 26, no steering assist torque is generated until the steering torque signal (corresponding to the differential value dT) reaches a specified value, even if a quick steering operation is performed, whereas once it has exceeded this value, the steering assist torque corresponding to the change in the steering torque signal is generated.

The electric motor control signal determination means 20 comprises a torque/control signal conversion section 21, a rotating speed/control signal conversion section 22, a subtracter 23, and an adder 24. The electric motor control signal determination means 20 generates an electric motor control signal $D_{T1}$ and an electric motor control signal $D_N$ based on the steering torque signal T and the steering rotating speed signal N, respectively, calculates the deviation of the electric motor control signal $D_{T1}$ from the electric motor control signal $D_N$ ($D_{T1}-D_N$) to attenuate the electric motor control signal, and provides to the electric motor drive means 16 the electric motor control signal $D_T$ obtained by adding to the deviation ($D_{T1}-D_N$) the electric motor control signal supplied from the differential value/control signal conversion section 26 ($=D_{T1}-D_N+D_{T2}$).

The torque/control signal conversion section 21 comprises a memory such as a ROM, and selects and outputs to the subtractor 23 the electric motor control signal $D_{T1}$ corresponding to the steering torque signal T detected by the steering torque sensor 12 based on a table showing the correspondence of the steering torque signal T and the electric motor control signal $D_{T1}$ which have been set in advance based on experimental or designed values.

Figure 11:
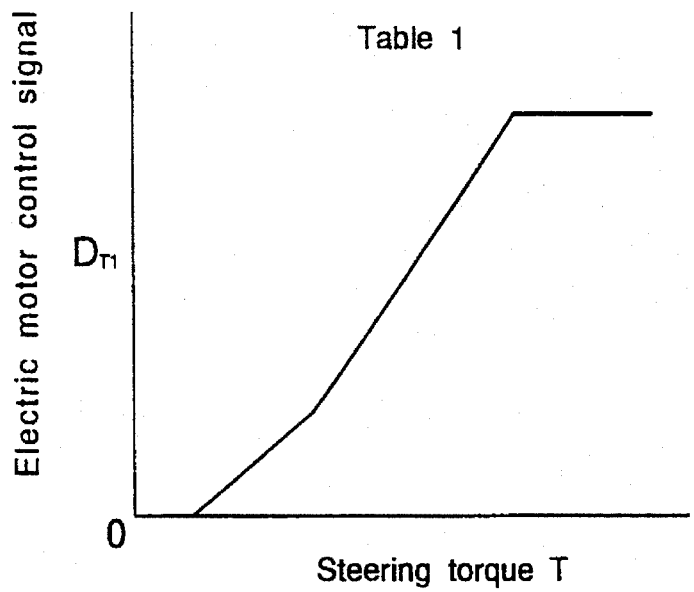
FIG. 11 is a characteristic chart showing the steering torque T versus the electric motor control signal $D_{T1}$ (Table 1)

The correspondence table for the steering torque T (steering torque signal T) and the electric motor control signal $D_{T1}$ should have a characteristic such that the electric motor control signal $D_{T1}$ increases with increasing steering torque T and finally becomes saturated, as shown in FIG. 11 (Table 1).

The rotating speed/control signal conversion section 22 also comprises a memory such as a ROM, selects and outputs to the subtractor 23 the electric motor control signal $D_N$ corresponding to the steering rotating speed signal N detected by the steering rotating speed sensor 13 based on a table showing the correspondence of the steering rotating speed signal N and the electric motor control signal $D_N$ which have been set in advance based on experimental or designed values.

Figure 18:
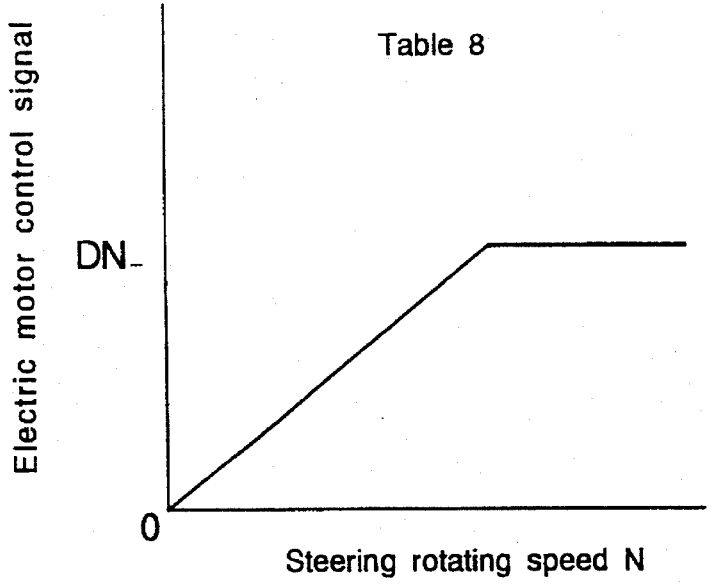
FIG. 18 is a characteristic chart showing the steering rotating speed N versus the electric motor control signal $D_{N-}$ (Table 8)

The correspondence table for the steering rotating speed N (steering rotating speed signal N) and the electric motor control signal $D_N$ should have a characteristic such that the electric motor control signal $D_N$ ($D_{N-}$) increase linearly with increasing steering rotating speed and finally becomes saturated, as shown in FIG. 18 (Table 8).

The subtractor 23 calculates the deviation of the electric motor control signal $D_{T1}$ corresponding to the steering torque signal T output from the torque/control signal conversion section 21 from the electric motor control signal $D_N$ corresponding to the steering rotating speed N output from the rotating speed/control signal conversion section 22 ($D_{T1}-D_N$), and provides the result to the adder 24.

The adder 24 calculates the electric motor control signal $D_T$ by adding to the deviation ($D_{T1}-D_N$) provided by the subtractor 23 the electric motor control signal $D_{T2}$ supplied from the differential value/control signal conversion section 26 ($=D_{T1}-D_N+D_{T2}$), and outputs the result to the electric motor drive means 16.

Although the torque/control signal conversion section 21, rotating speed/control signal conversion section 22, subtractor 23, and adder 24 of the electric motor control signal determination means 20 each comprise hardware, they can comprise software programs using the memory, mathematic operation, and processing functions of microprocessors.

In response to the electric control signal $D_T$ ($=D_{T1}-D_N+D_{T2}$) output from the control means 15, the electric motor drive means 16 outputs the electric motor drive signal $M_o$ to drive the electric motor 10, thereby transmitting the steering assist torque corresponding to the steering operation by the driver (the steering torque T and the steering rotating speed N) from the motor 10 to the steering system. As described above, the control means 15 of the electric power steering apparatus 1 according to this invention includes the differential operation means 25 and the differential value/control signal conversion section 26 to calculate the steering torque difference dT (the differential value dT) and to convert it into the corresponding electric motor control signal $D_{T2}$ for output. It can thus obtain a responsive steering assist torque when a quick steering operation results in the steering torque signal T exceeding a specified value.

Figure 7:
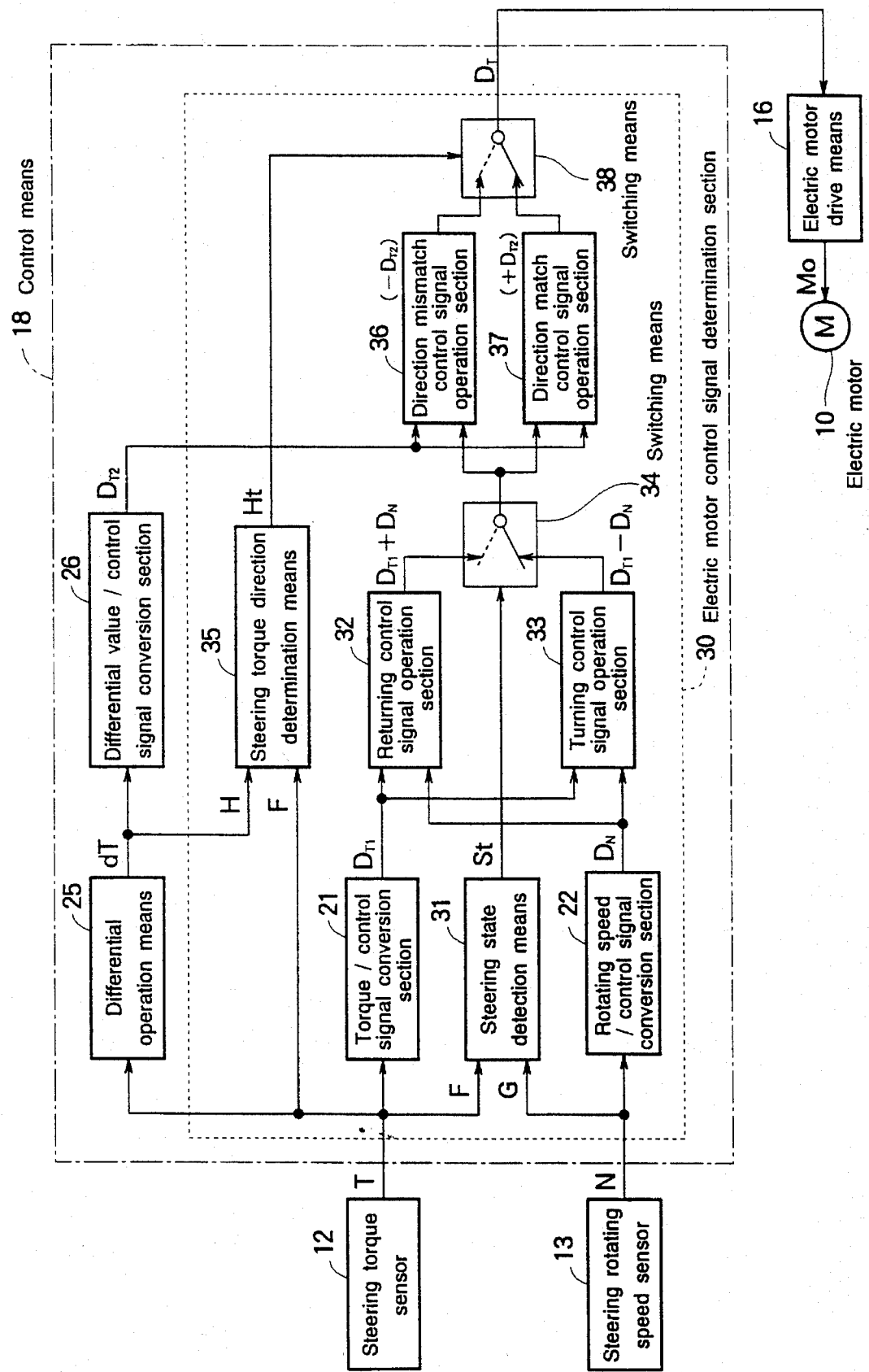
FIG. 7 is a functional block diagram of the integral part of a second embodiment of the control means of the electric power steering means according to this invention.

FIG. 7 is a block diagram of a second embodiment of the control means of the electric power steering apparatus according to this invention.

In this figure, a control means 18 comprises the differential operation means 25, the differential value/control signal conversion section 26, and an electric motor control signal determination means 30.

The control means 18 in FIG. 7 differs from the control means 15 in FIG. 6 in that the electric motor control signal determination means 30 includes a function block for detecting the state of the steering wheel and the direction of the steering torque to process electric motor control signals.

The differential operation means 25 and the differential value/control signal conversion section 26 have the same configurations as in FIG. 6, and the description is thus omitted.

The electric motor control signal determination means 30 comprises the torque/control signal conversion section 21, the rotating speed/control signal conversion section 22, a steering wheel state detection means 31, a returning control signal operation section 32, a turning Control signal operation section 33, switching means 34 and 38, a steering torque direction determination means 35, a direction mismatch control signal operation section 36, and a direction match control signal operation section 37 to output the electric motor control signal $D_T$ corresponding to the state of the steering wheel and the direction of the steering torque based on the steering torque signal T and the steering rotating speed signal N.

The steering wheel state detection means 31 has a code determination function to compare a code F showing the direction for the steering torque signal T and a code G showing the direction for the steering rotating speed signal N. It outputs, for example, an H level steering wheel state signal $S_t$ to the switching means 34 if the codes match (F=G: the steering wheel turning state), whereas it outputs, for example, an L level steering wheel state signal $S_t$ to the switching means 34 if the codes do not match (F≠G: the steering wheel returning state), thereby allowing the electric motor control signal corresponding to the state of steering wheel ($D_{T1}+D_N$ or $D_{T1}-D_N$) to be selected.

The returning control signal operation section 32 and the turning control signal operation section 33 include addition and subtraction functions, respectively, to add and subtract the electric motor control signal $D_N$ corresponding to the steering rotating speed N to and from the electric motor control signal $D_{T1}$ corresponding to the steering torque T, the signals converted by the torque/control signal conversion section 21 and the rotating speed/control signal conversion section 22, respectively. It then supplies each of the electric motor control signals obtained ($D_{T1}+D_N$ and $D_{T1}-D_N$) to the switching terminal of the switching means 34. The switching means 34 comprises, for example, a hardware-based electronic switch or a software-based switching function. It selects between the electric motor control signals ($D_{T1}+D_N$ and $D_{T1}-D_N$) based on the steering wheel state signal $S_t$ (the H or L level) from the steering wheel state detection means 31, and outputs the selected electric motor control signal ($D_{T1}+D_N$ or $D_{T1}-D_N$) to the direction mismatch control signal operation section 36 and the direction match control signal operation section 37.

For example, the electric motor control signal ($D_{T1}-D_N$) is output if the steering wheel state signal $S_t$ is at the H level (the steering wheel turning state), whereas the electric motor control signal ($D_{T1}+D_N$) is output if the steering wheel state signal $S_t$ is at the L level (the steering wheel returning state).

Like the steering wheel state detection means 31, the torque direction determination means 35 has a code determination function to compare a code F showing the direction for the steering torque signal T and a code H from the differential operation means 25 showing the direction for the differential value dT. It outputs, for example, an H level steering wheel state signal $H_t$ to the switching means 38 if the codes match (F=H: direction match), whereas it outputs, for example, an L level steering wheel state signal $H_t$ to the switching means 38 if the codes do not match (F≠H: direction mismatch), thereby allowing the electric motor control signal corresponding to the state of steering ($D_{T1}-D_N+D_{T2}$, $D_{T1}+D_N+D_{T2}$, $D_{T1}-D_N-D_{T2}$, or $D_{T1}+D_N-D_{T2}$) to be selected.

The direction mismatch control signal operation section 36 has a subtraction function to output to the switching means 38 a deviation ($D_{T1}-D_N-D_{T2}$ or $D_{T1}+D_N-D_{T2}$) obtained by correctively damping from the electric motor control signal ($D_{T1}-D_N$ or $D_{T1}+D_N$) corresponding to the turning or returning state of the steering wheel supplied from the switching means 34, the electric motor control signal $D_{T2}$ from the differential value/control signal conversion section 26.

The direction match control signal operation section 37 has an addition function to output to the switching means 38 a sum ($D_{T1}-D_N+D_{T2}$ or $D_{T1}+D_N+D_{T2}$) obtained by correctively adding the electric motor control signal $D_{T2}$ from the differential value/control signal conversion section 26 to the electric motor control signal ($D_{T1}-D_N$ or $D_{T1}+D_N$) corresponding to the turning or returning state of the steering wheel supplied from the switching means 34.

Like the switching means 34, the switching means 38 comprises, for example, a hardware-based electronic switch or a software-based switching function. It selects between the direction mismatch control signal operation section 36 and the direction match control signal operation section 37 based on the steering torque direction signal $H_t$ from the steering torque direction determination means, selects between the combination of the electric motor control signals ($D_{T1}-D_N-D_{T2}$ and $D_{T1}+D_N-D_{T2}$) and the combination of the electric motor control signals ($D_{T1}-D_N+D_{T2}$ and $D_{T1}+D_N+D_{T2}$), and outputs the selected electric motor control signal to the electric motor drive means 16 as the electric motor control signal $D_T$.

For example, the switching means 38 outputs the electric motor control signal ($D_{T1}-D_N+D_{T2}$ or $D_{T1}+D_N+D_{T2}$) if the steering wheel state signal $H_t$ is at the H level (F=H: direction match), whereas it outputs the electric motor control signal ($D_{T1}-D_N-D_{T2}$ or $D_{T1}+D_N-D_{T2}$) if the steering wheel state signal $H_t$ is at the L level (F≠H: direction mismatch).

Each function block of the electric motor control signal determination means 30 can comprise software programs using the memory, mathematic operation, and processing functions of microprocessors.

In response to the electric motor control signal $D_T$ ($D_{T1}-D_N-D_{T2}$, $D_{T1}+D_N-D_{T2}$, $D_{T1}-D_N+D_{T2}$, or $D_{T1}+D_N+D_{T2}$) output from the control means 18, the electric motor drive means 16 outputs the electric motor drive signal $M_o$ to drive the electric motor 10, thereby transmitting the steering assist torque corresponding to the steering operation by the driver (the steering torque T, steering rotating speed N, state of steering, and direction of the steering torque) from the motor 10 to the steering system.

As described above, since the control means 18 of the electric power steering apparatus 1 according to this invention includes the differential operation means 25 and the differential value/control signal conversion section 26 as well as the steering state detection means 31 and the steering torque direction determination means 35, it can convert the torque differential value dT into the corresponding electric motor control signal $D_{T2}$ and output this signal, enabling a responsive steering assist torque to be obtained when a quick steering operation results in the steering torque signal T exceeding a specified value, the steering assist torque also corresponding to the combination of the turning or returning state of the steering wheel and the match or mismatch state of the steering torque direction.

Figure 8:
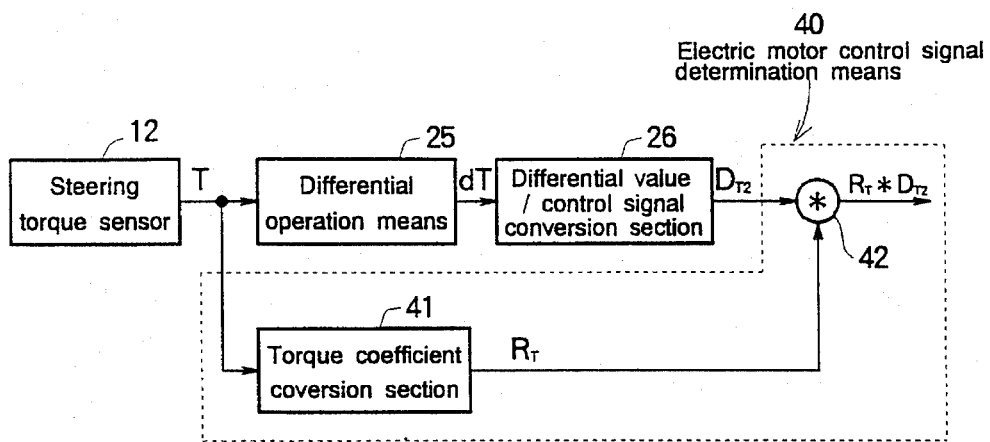
FIG. 8 is a functional block diagram of the integral part of a first embodiment of an electric motor control signal determination means in the electric power steering means according to this invention.

FIG. 8 is a functional block diagram of a first embodiment of the electric motor signal determination means of the electric power steering means according to this invention.

In this figure, an electric motor control signal determination means 40 comprises a torque coefficient conversion section 41 and a multiplication function 42 to output to the multiplication function 42 the torque coefficient $R_T$ corresponding to the steering torque signal T from the steering torque sensor 12 based on a conversion table (see Table 2 in FIG. 12) for the steering torque signal T and the correction factor $R_T$ (the torque coefficient $R_T$) which have been set in the ROM in advance.

The multiplication function 42 comprises a multiplier or a multiplication program to output as the electric motor control signal $D_{T2}$ an electric motor control signal ($R_T * D_{T2}$) obtained by multiplying the electric motor control signal $D_{T2}$ from the differential value/control signal conversion section 26 by the torque coefficient $R_T$ from the torque coefficient conversion section 41.

Figure 12:
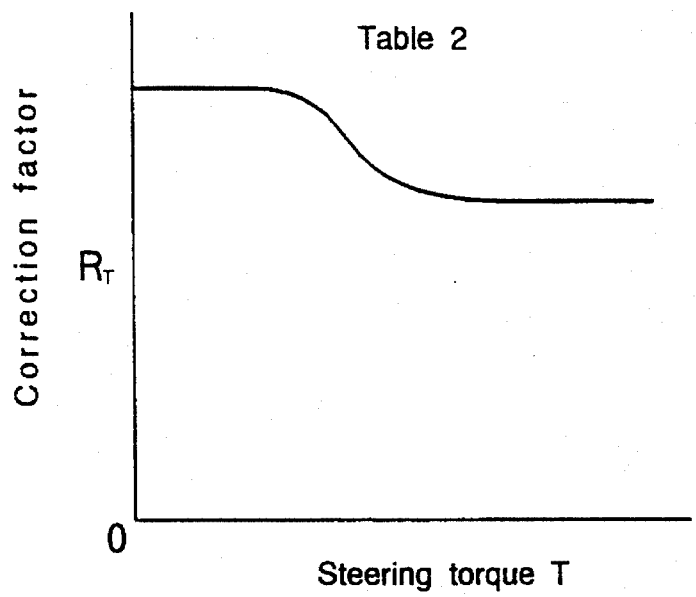
FIG. 12 is a characteristic chart showing the steering torque T versus the correction factor $R_T$ (torque coefficient $R_T$) (Table 2)

Since the correspondence table for the steering torque T (steering torque signal T) and the correction factor $R_T$ (the torque coefficient $R_T$) is set so that the correction factor decreases with increasing steering torque T within a specified range, as shown in the characteristic chart in FIG. 12 (see Table 2), the electric motor control signal $D_{T2}$ (=$R_T * D_{T2}$) correctively reduces the electric motor control signal $D_{T2}$ according to the characteristic of the torque coefficient $R_T$ as the steering torque T increases.

Figure 9:
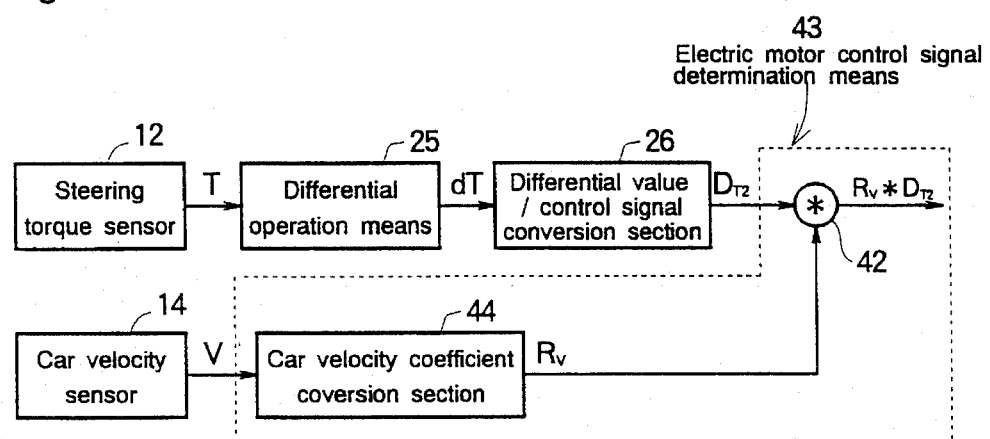
FIG. 9 is a functional block diagram of the integral part of a second embodiment of the electric motor control signal determination means of the electric power steering means according to this invention.

FIG. 9 is a functional block diagram of a second embodiment of the electric motor signal determination means of the electric power steering means according to this invention.

In this figure, an electric motor control signal determination means 43 comprises a car velocity coefficient conversion section 44 and the multiplication function 42 to output to the multiplication function 42 the car velocity coefficient $R_V$ corresponding to the car velocity V from the car velocity sensor 14 based on a conversion table (see Table 6 in FIG. 16) for the car velocity V and a correction factor $R_V$ (the car velocity coefficient $R_{V3}$) which have been set in the ROM in advance.

Figure 16:
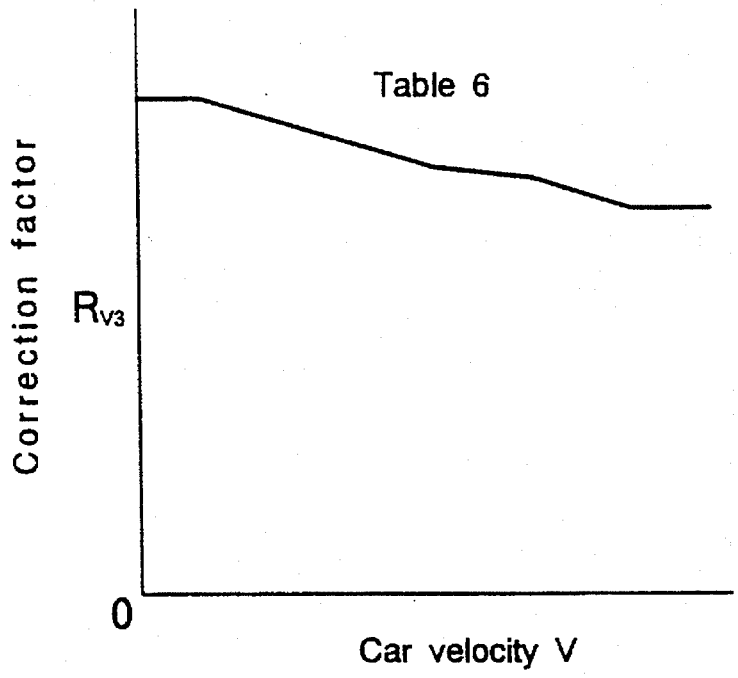
FIG. 16 is a characteristic chart showing the car velocity V versus the correction factor $R_{V3}$ (car velocity coefficient $R_{V3}$) (Table 6)

Since the correspondence table for the car velocity V (a car velocity signal V) and the correction factor $R_V$ (the car velocity coefficient $R_{V3}$) is set so that the correction factor decreases with increasing car velocity V, as shown in the characteristic chart in FIG. 16 (Table 6), the electric motor control signal determination means correctively reduces the electric motor control signal $D_{T2}$ ($R_V * D_{T2}$) according to the characteristic of the car velocity coefficient $R_V$ as the steering torque increases.

Figure 10:
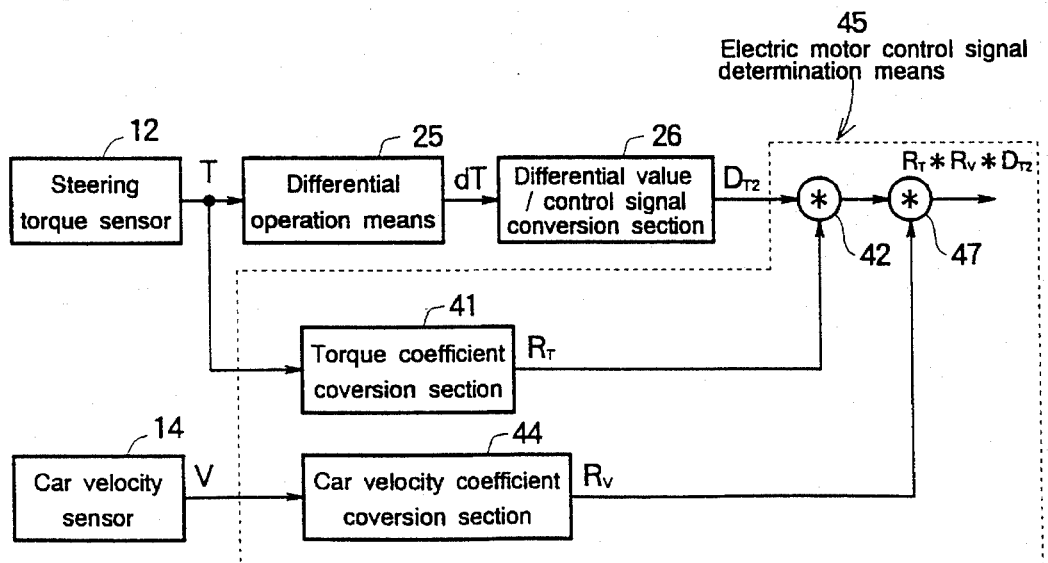
FIG. 10 is a functional block diagram of the integral part of a third embodiment of the electric motor control signal determination means of the electric power steering means according to this invention.

FIG. 10 is a functional block diagram of a third embodiment of the electric motor signal determination means of the electric power steering means according to this invention.

In this figure, an electric motor control signal determination means 45 comprises the torque coefficient conversion section 41, the car velocity coefficient conversion section 44, the multiplication function 42, and a multiplication function 47 to have the functions and effects of both the electric motor control signal determination means in FIG. 8 and the electric motor control signal determination means 43 in FIG. 9. It thus multiplies the torque coefficient $R_T$ and the car velocity $R_V$ by the electric motor control signal $D_{T2}$, ($R_T * R_V * D_{T2}$), and correctively reduces the electric motor control signal $D_{T2}$ according to the characteristics of both the torque coefficient $R_T$ and the car velocity $R_V$ as the steering torque T and the car velocity V increase.

Next, the operation of the control section of the electric power steering apparatus according to this invention is described.

Figure 20:
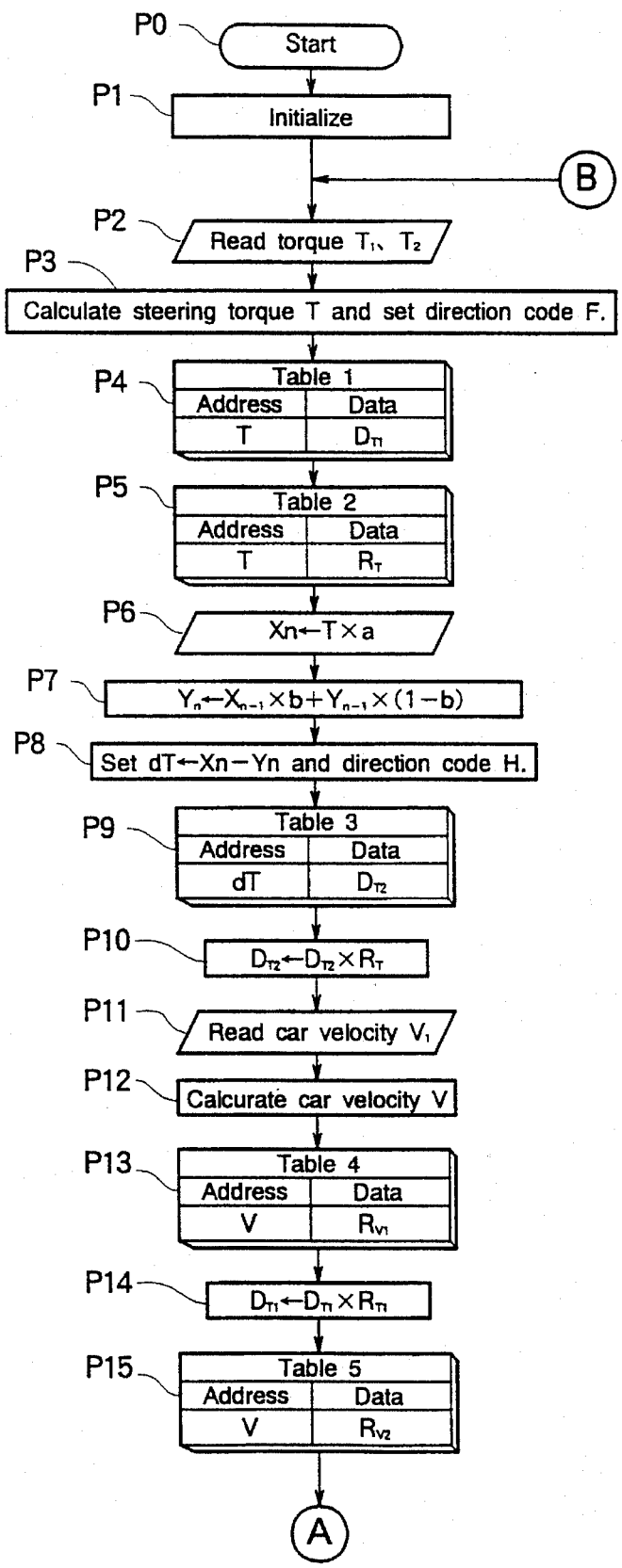
FIGS. 20 and 21 show the operational flow of the control section of the electric power steering apparatus according to this invention.
Figure 21:
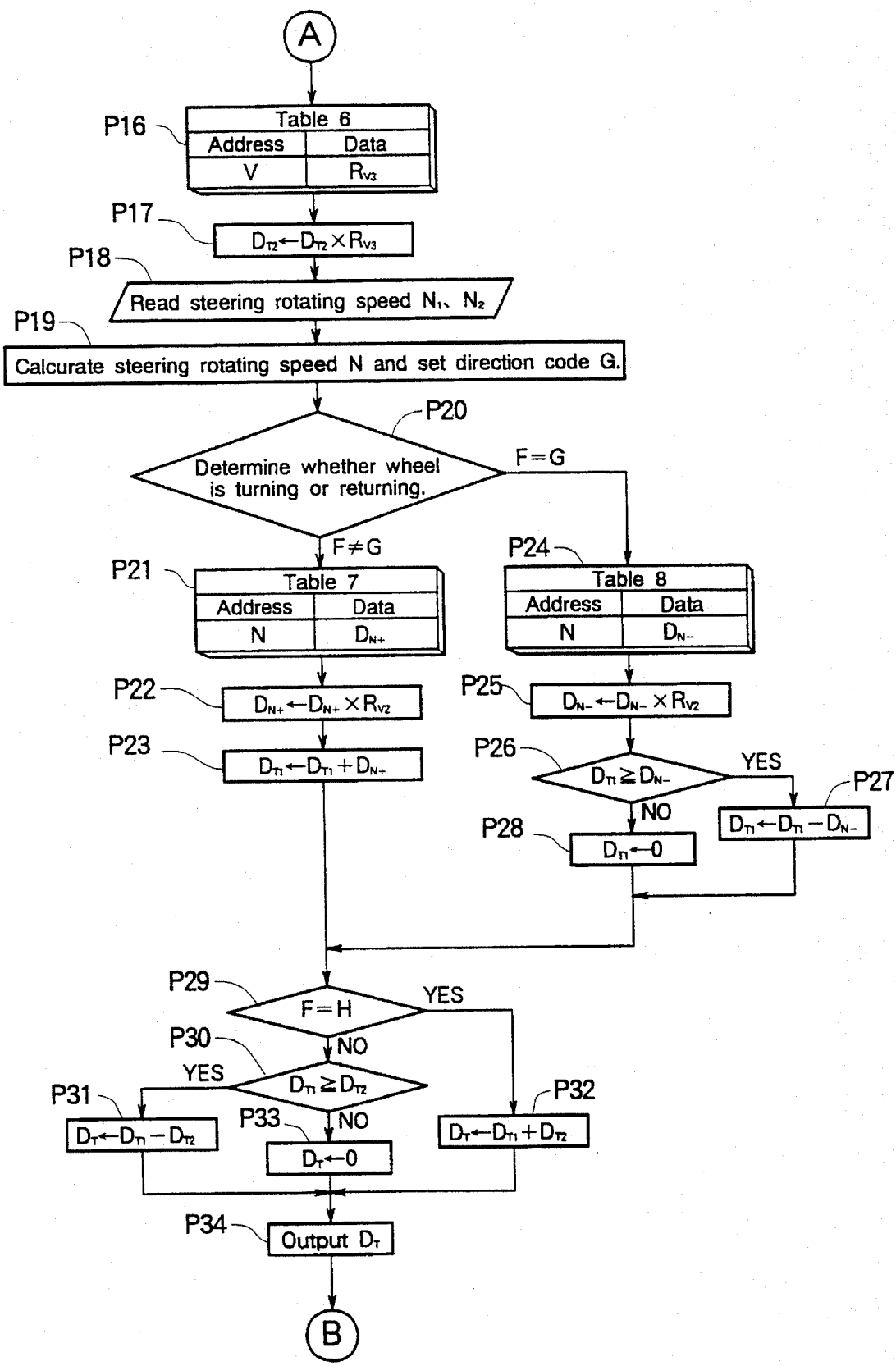

FIGS. 20 and 21 show the operational flow of the control section of the electric power steering apparatus according to this invention.

These figures show a case of software-based programming control.

First, at step P1, the microprocessor and the memory such as a RAM that constitute the control means are initialized to set all these function blocks to their initial states.

Next, at step P2, steering torques $T_1$, $T_2$ detected by the steering torque sensor 12 are sequentially read, and at step P3, the relevant mathematic operation for the steering torque is carried out to store the direction code F for the steering torque in the RAM.

At step P4, the electric motor control signal $D_{T1}$ with the steering torque T (an absolute value) as an address is read from the ROM (see Table 1 in FIG. 11) with this signal stored therein in advance.

Similarly, at step P5, the correction factor $R_T$ (the torque coefficient $R_T$) with the steering torque T as an address is read from the ROM (see Table 2 in FIG. 12) with this correction factor stored therein in advance.

Subsequently, at step P6, the current value $X_n$ of X is obtained by multiplying the steering torque T by a constant (a), and at step P7, the value of Y that is to be subtracted from X is calculated.

A value obtained by multiplying the previous value $Y_{n-1}$ of Y by (1-b) is added to a value obtained by multiplying the previous value $X_{n-1}$ of X by a constant (b), and the result is stored in the RAM as the current value $Y_n$ of Y.

At step P8, the deviation between the current value $X_n$ of X and the current value $Y_n$ of Y is calculated, and the result of this operation is used to determine the steering torque difference dT ($X_n-Y_n$) and the direction code H for the steering torque difference, which are then stored in the RAM.

At step P9, the electric motor control signal $D_{T2}$ with the steering torque difference dT as an address is read from the ROM (see Table 3 in FIG. 13) with this signal stored therein in advance.

At step P10, the electric motor control signal $D_{T2}$ is multiplied by the correction factor $R_T$ (the torque coefficient $R_T$) read from Table 2 ($R_T \times D_{T2}$), and the result of this operation is stored in the RAM as a new electric motor control signal $D_{T2}$.

Next, at step P11, a car velocity $V_1$ detected by the car velocity sensor 14 is read, and at step P12, the car velocity V is calculated and stored in the RAM.

Figure 14:
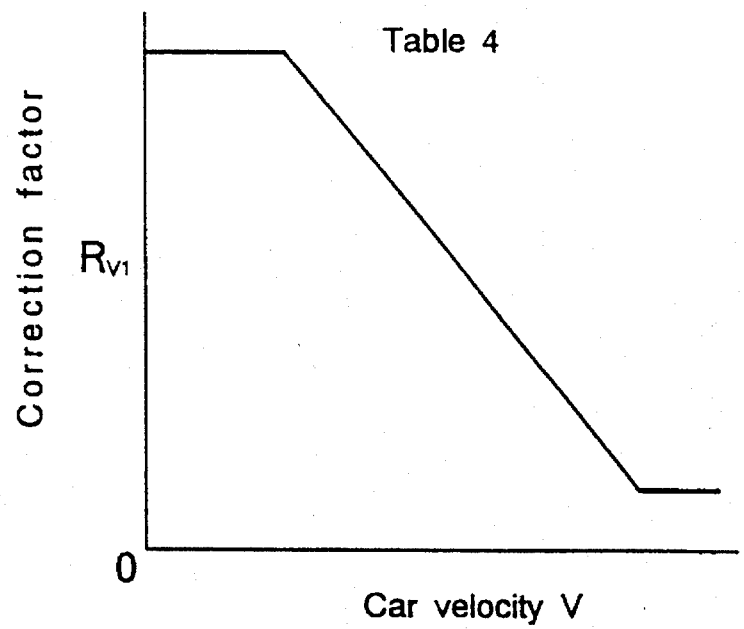
FIG. 14 is a characteristic chart showing the car velocity V versus the correction factor $R_{V1}$ (car velocity coefficient $R_{V1}$) (Table 4)

At step P13, the correction factor $R_{V1}$ (the car velocity coefficient $R_{V1}$) with the car velocity V as an address is read from the ROM (see Table 4 in FIG. 14) with this factor stored therein in advance. At step P14, the correction factor $R_{V1}$ is multiplied by the electric motor control signal $D_{T1}$ read from Table 1 ($R_{V1} \times D_{T1}$), and the result of this operation is stored in the RAM as a new electric motor control signal $D_{T1}$.

Figure 15:
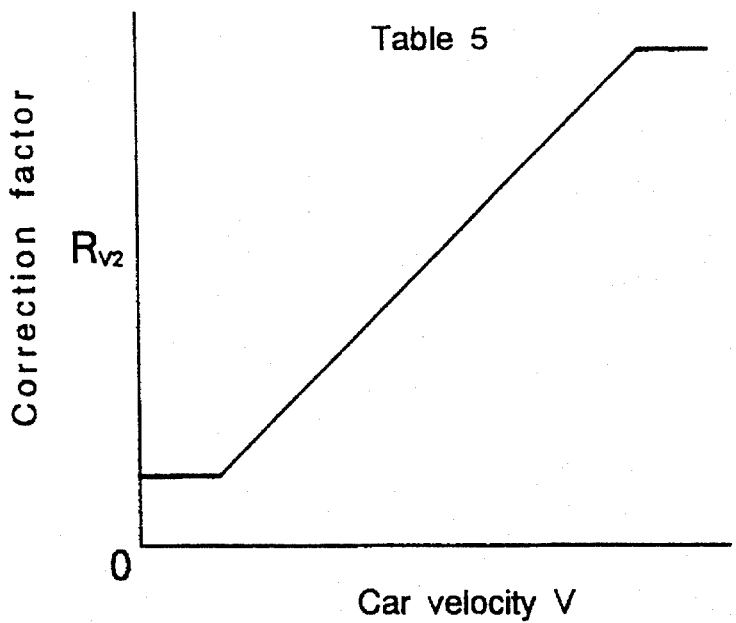
FIG. 15 is a characteristic chart showing the car velocity V versus the correction factor $R_{V2}$ (car velocity coefficient $R_{V2}$) (Table 5)

At step P15, the correction factor $R_{V2}$ (the car velocity coefficient $R_{V2}$) with the car velocity V as an address is read from the ROM (see Table 5 in FIG. 15) with this factor stored therein in advance, and at step P16, the correction factor $R_{V3}$ (the car velocity coefficient $R_{V3}$) with the car velocity V as an address is read from the ROM (see Table 6 in FIG. 16) with this factor stored therein in advance.

At step P17, the new electric motor control signal $D_{T2}$ ($R_T \times D_{T2}$) determined in step P10 is multiplied by the correction factor $R_{V3}$ (the car velocity coefficient $R_{V3}$) ($R_T \times R_{V3} \times D_{T2}$), and the result of this operation is stored in the RAM as an electric motor control signal $D_{T2}$.

Furthermore, at step P18, steering rotating speeds $N_1$, $N_2$ detected by the steering rotating speed sensor 13 are sequentially read, and at step P19, the relevant mathematic operation for the steering rotating speed is carried out to store the direction code G for the steering rotating speed in the RAM.

Subsequently, at step P20, the process determines whether or not the steering wheel is in the turning or returning state, and compares the direction code F for the steering torque T to the direction code G for the steering rotating speed N. If the code F and the code G differ (F≠G), the process determines that the steering wheel is in the returning state and then proceeds to step P21. If, however, the code F and the code G match (F=G), the process determines that the steering wheel is in the turning state and then proceeds to step P24.

Figure 17:
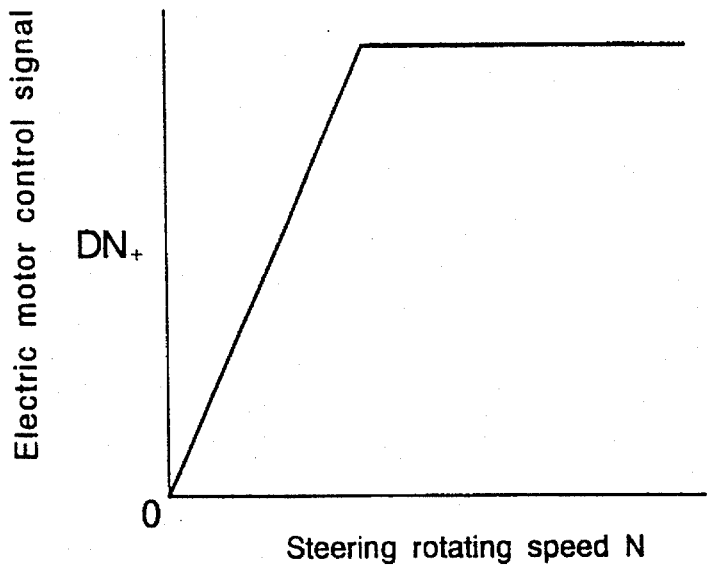
FIG. 17 is a characteristic chart showing the steering rotating speed N versus the electric motor control signal $D_{N+}$ (Table 7)

At step P21 for the returning state of the steering system, the electric motor control signal $D_{N+}$ with the steering rotating speed N as an address is read from the ROM (see Table 7 in FIG. 17) with this speed stored therein in advance. At step P22, the electric motor control signal $D_{N+}$ is multiplied by the correction factor $R_{V2}$ (the car velocity coefficient $R_{V2}$) read from Table 5 ($R_{V2} \times D_{N+}$), and the result of this operation is stored in the RAM as a new electric motor control signal $D_{N+}$. At step 23, the electric motor control signal $D_{T1}$ determined in step P14 is added to the electric motor control signal $D_{N+}$ ($D_{T1}+D_{N+}$), and the result of this operation is used as the electric motor control signal $D_{T1}$ to generate an amount of damping, and the process proceeds to step P29.

At step P24 for the turning state of the steering wheel, the electric motor control signal $D_{N-}$ with the steering rotating speed N as an address is read from the ROM (see Table 8 in FIG. 18) with this speed stored therein in advance. At step P25, the electric motor control signal $D_{N-}$ is multiplied by the correction factor $R_{V2}$ (the car velocity coefficient $R_{V2}$) read from Table 5 ($R_{V2} \times D_{N-}$), and the result of this operation is stored in the RAM as a new electric motor control signal $D_{N-}$. At step P26, the electric motor control signal $D_{T1}$ determined in step P14 is compared to the new electric motor control signal $D_{N-}$. If the electric motor control signal $D_{T1}$ is larger than the electric motor control signal $D_{N-}$, the process proceeds to step P27 to determine the deviation between the electric motor control signal $D_{T1}$ and the electric motor control signal $D_{N-}$ ($D_{T1}-D_{N-}$), the deviation then constituting an electric motor control signal $D_{T1}$. If the electric motor control signal $D_{T1}$ is smaller than the electric motor control signal $D_{N-}$, the process sets the electric motor control signal $D_{T1}$ at 0, uses the result of these operations as the electric motor control signal $D_{T1}$ to generate a damping force, and proceeds to step P29.

Step 29 subsequently determines whether the steering torque has increased or decreased.

If the direction code F for the steering torque and the direction code H for the steering torque difference dT match (F=H) (the steering torque has increased), the process adds the electric motor control signal $D_{T2}$ to the electric motor control signal $D_{T1}$ ($D_{T1}+D_{T2}$), uses the result of this operation as the electric motor control signal $D_T$ (step P32), and proceeds to step P34 to output the electric motor control signal $D_t$ in order to drive and control the electric motor drive means 16.

If at step P29, the direction code F for the steering torque and the direction code H for the steering torque difference dT do not match (F≠H) (the steering torque has decreased), the electric motor control signal $D_{T1}$ is compared to the electric motor control signal $D_{T2}$. If the electric motor control signal $D_{T1}$ is larger than the electric motor control signal $D_{T2}$, the process calculates the deviation between the electric motor control signal $D_{T1}$ and the electric motor control signal $D_{T2}$ ($D_{T1}-D_{T2}$), and the result of this operation constitutes an electric motor control signal $D_T$ (step P31). The process then proceeds to step P34 to output the electric motor control signal $D_T$ in order to drive and control the electric motor drive means 16.

In addition, if as a result of the comparison of the electric motor control signal $D_{T1}$ to the electric motor control signal $D_{T2}$, the electric motor control signal $D_{T1}$ is smaller than the electric motor control signal $D_{T2}$, the process sets the electric motor control signal $D_T$ at 0 (step P33), and proceeds to step P34 to output the electric motor control signal $D_T$ in order to drive and control the electric motor drive means 16.

Figure 19:
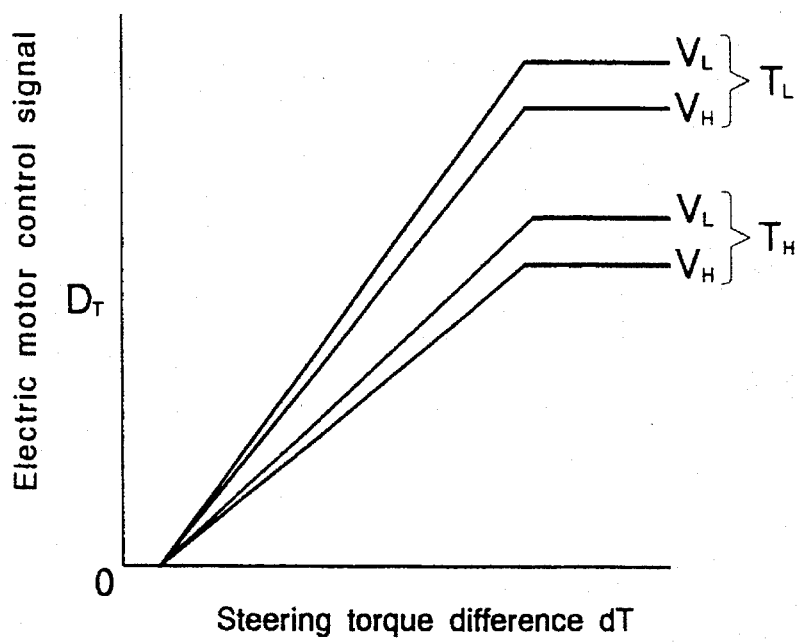
FIG. 19 is a characteristic chart showing the steering torque difference dT versus the electric motor control signal $D_T$.

The execution of the above operation control enables the electric motor control signal $D_T$ corresponding to the steering torque difference dT to be obtained using as parameters the steering torque T and the car velocity V shown in the characteristic chart for the steering torque difference dT versus the electric motor control signal $D_T$ in FIG. 19 (that is, according to the steering torque T and the car velocity T).

$T_L$ and $T_H$ in FIG. 19 represent a large and a small torques T, respectively, and $V_L$ and $V_H$ represent a large and a small car velocities, respectively.

As described above based on the embodiment, this invention comprises a steering torque detection means, steering rotating speed detection means, a differential operation means, an electric motor control signal determination means, and an electric motor drive means, and detects the steering torque and steering rotating speed of the steering system to generate as an electric motor control signal a control quantity obtained by damping the value corresponding to the steering rotating speed from the value corresponding to the steering torque and then adding to the result a steering torque differential value in order to drive the electric motor based on this electric motor control signal, thereby enabling a steering assist torque corresponding to a change in the steering torque to be obtained even when a steering operation with a sudden increase in the steering torque is performed and thus enabling a responsive steering assist torque to be generated to improve the steering feeling.

In addition, this invention comprises a steering torque detection means, steering rotating speed detection means, a differential operation means, an electric motor control signal determination means, and an electric motor drive means, and on detecting the turning state of the steering system, generates a control quantity obtained by correctively damping the value corresponding to the steering rotating speed from the value corresponding to the steering torque, while on detecting the returning state of the steering system, generating a control quantity obtained by correctively adding the value corresponding to the steering rotating speed to the value corresponding to the steering torque, and if the direction of the steering torque matches the direction of the steering torque difference, generates as an electric motor control signal a control quantity obtained by correctively adding a steering torque differential value to the control quantity obtained by corrective substraction or addition, while generating as an electric motor control signal a control quantity obtained by correctively damping a steering torque differential value from said control quantity if the direction of the steering torque fails to match the direction of the steering torque difference, in order to drive the electric motor based on these electric motor control signals, thereby providing a steering assist torque according to the combination of the turning or returning state of the steering system and the match or mismatch state of the steering torque direction and thus an optimum steering assist torque according to the vehicle travel state and the steering operation state.

Furthermore, this invention includes an electric motor control signal determination means for correctively damping from the control quantity the value corresponding to a signal output from the differential operation means based on the value corresponding to a signal output from the steering torque detection means to correct the steering assist torque using the value corresponding to a signal output from the differential operation means and corresponding to the steering torque, thereby providing a steering assist torque according to the steering torque.

This invention also includes an electric motor control signal determination means for correctively damping from the control quantity the value corresponding to a signal output from the differential operation means based on the value corresponding to a signal output from the car velocity detection means to correct the steering assist torque using the value corresponding to a signal output from the differential operation means and corresponding to the car velocity, thereby providing a steering assist torque according to the car velocity.

Furthermore, this invention includes an electric motor control signal determination means for correctively damping from the control quantity the value corresponding to a signal output from the differential operation means based on both the value corresponding to a signal output from the steering torque detection means and the value corresponding to a signal output from the car velocity detection means to correct the steering assist torque using the value corresponding to a signal output from the differential operation means and corresponding to both the steering torque and car velocity, thereby providing a steering assist torque according to both the steering torque and car velocity.

Therefore, this invention can provide a n electric power steering apparatus with a high steering performance which generates a steering assist torque that can fit the amount of damping for the steering system to the characteristics of the vehicle and smoothly increase the steering torque while preventing an unwanted increase in the steering torque due to a quick steering operation during fast travel.

We claim:

1. An electric power steering apparatus for applying the power of an electric motor to a steering system to reduce the steering torque, comprising:

a steering torque detection means for detecting the steering torque of the steering system; a differential operation means for differentiating said steering torque; a steering rotating speed detection means for detecting the steering rotating speed of the steering system; an electric motor control signal determination means for determining an electric motor control signal by damping the value corresponding to a signal output from said steering rotating speed detection means from the value corresponding to a signal output from said steering torque detection means and then adding to the result the value corresponding to a signal output from said differential operation means; and an electric motor drive means for driving said electric motor based on the signal output from this electric motor control signal determination means.

2. An electric power steering apparatus for applying the power of an electric motor to a steering system to reduce the steering torque, comprising:

a steering torque detection means for detecting the steering torque of the steering system; a differential operation means for differentiating said steering torque; a steering rotating speed detection means for detecting the steering rotating speed of the steering system; a steering state detection means for detecting the turning and returning states of the steering system, a steering torque direction determination means for determining whether or not the direction of said steering torque matches the direction of said steering torque differential value, an electric motor control signal determination means for determining an electric motor control signal by correctively damping on detecting the turning state of the steering system, the value corresponding to a signal output from the steering rotating speed detection means from the value corresponding to a signal from the steering torque detection means, correctively adding, on detecting the returning state of the steering system, the value corresponding to a signal from the steering rotating speed detection means to the value corresponding to a signal from the steering torque detection means, correctively adding to the control quantity the value corresponding to a signal output from said differential operation means if said steering torque direction determination means determines a match of direction, and correctively damping from the control quantity the value corresponding to a signal output from said differential operation means if said steering torque direction determination means determines a mismatch of direction; and an electric motor drive means for driving said electric motor based on the signal output from this electric motor control signal determination means.

3. An electric power steering apparatus according to claim 1 or claim 2 wherein said electric motor control signal determination means correctively reduces the value corresponding to a signal output from said differential operation means based on the value corresponding to a signal output from said steering torque detection means.

4. An electric power steering apparatus according to claim 1 or claim 2 wherein said electric motor control signal determination means correctively reduces the value corresponding to a signal output from said differential operation means based on the value corresponding to a signal output from said car velocity detection means.

5. An electric power steering apparatus according to claim 1 or claim 2 wherein said electric motor control signal determination means correctively reduces the value corresponding to a signal output from said differential operation means based on both the value corresponding to a signal output from said steering torque detection means and the value corresponding to a signal output from said car velocity detection means.

6. An electric power steering apparatus according to claim 1 or claim 2 including a differential value/control signal conversion means for converting a differential value from said differential operation means into an electric motor control signal.

* * * * *